United States Patent [19]
Eisenmann et al.

[11] Patent Number: 5,937,263
[45] Date of Patent: Aug. 10, 1999

[54] CUP-SHAPED POROUS METAL ULTRA-HIGH EFFICIENCY FILTER AND METHOD OF MAKING SAME

[75] Inventors: Mark R. Eisenmann, Burlington; David P. Westfall, Bristol, both of Conn.

[73] Assignee: Mott Metallurgical Corporation, Farmington, Conn.

[21] Appl. No.: 08/895,604

[22] Filed: Jul. 16, 1997

[51] Int. Cl.$^6$ ........................................ B22F 3/12
[52] U.S. Cl. ................... 419/2; 419/38; 419/49
[58] Field of Search .................... 419/38, 49, 2

[56] References Cited

U.S. PATENT DOCUMENTS

| | | | |
|---|---|---|---|
| 1,648,721 | 11/1927 | Claus | 419/38 |
| 2,127,994 | 8/1938 | Davis et al. | 18/55 |
| 2,996,759 | 8/1961 | Smith | 18/16.5 |
| 3,632,243 | 1/1972 | Mott | 425/78 |
| 5,114,447 | 5/1992 | Davis | 55/485 |

*Primary Examiner*—Daniel J. Jenkins
*Attorney, Agent, or Firm*—Hale and Dorr LLP

[57] ABSTRACT

A cup-shaped sintered metal ultra-high efficiency filter which is capable of achieving of at least 99.9999999% efficiency at a most penetrating particle size at the maximum rated flow is produced using a metal powder with particles of less than 20 micrometers in diameter in a mold having a cylindrical cavity with an end closure at one end and a removable cap at its other end. A core rod is seated in the end closure and extends coaxially within the cavity with its upper end disposed at a predetermined distance from the open end of the mold. The mold is oriented vertically with the open other end disposed upwardly, and metal powder is introduced into the cavity while vibrating the mold to achieve substantially uniform packing of the metal powder to a level above the core rod. The cap is placed on the open end of the mold and pressure is applied to the metal powder in the cavity to cause the metal powder to cohere and form a cup-shaped powdered metal structure having a cylindrical peripheral wall and an end wall. This cup-shaped structure is removed from the mold and sintered to obtain a porous cup-shaped sintered metal filter.

35 Claims, 4 Drawing Sheets

CUP-SHAPED POROUS METAL ULTRA-HIGH EFFICIENCY FILTER AND METHOD OF MAKING SAME

BACKGROUND OF THE INVENTION

The present invention relates to sintered metal filters, and, more particularly to a method for making such filters for removing efficiently extremely small particles from a stream of gas passing therethrough.

As is well known, high efficiency porous sintered metal filters are widely utilized in the electronic and other industries wherein an extremely clean environment is necessary in order to avoid contamination of sensitive products. For example in the electronics industry, inline filters are frequently used to treat the process gases to avoid introduction of any particulate matter in the manufacturing process for semiconductors and thereby contamination of the electronic products.

The electronic industry has recognized the advantages in use of sintered metal filters to achieve highly efficient removal of small particles. Illustrative of structures for this purpose are those indicated in Davis U.S. Pat. No. 5,114,447 granted May 19, 1992 and Zeller U.S. Pat. No. 5,487,771 granted Jan. 31, 1996.

Although the filters shown in these patents are effective to remove small particles in the gas stream, the relatively large internal volume of the filter chambers which they require relative to the actual volume occupied by the filter element provides dead space for gas entrapment and moisture buildup. The special housing designs to receive such filters and provide sufficient filter area often require special closures and multiple welds, and these must be helium tested or pressure tested. Moreover, multipart housings increase the costs and time for manufacture.

The electronics industry is desirous of inline filters which may be readily installed and quickly purged and which will achieve a high efficiency rate of removal of 99.9999999% determined at a most penetrating particle size i.e. log reduction value (9LRV), at the rated flow. The test methodology for evaluating 9 log removal rating is described in Rubow, K. L., D. S. Prause and M. R. Eisenmann, "*A Low Pressure Drop Sintered Metal Filter for Ultra-High Purity Gas Systems*", Proceedings of the 43rd Annual Technical Meeting of the Institute of Environmental Sciences, Los Angeles, Calif. May 6–8, 1997, and Rubow, K. L. and C. B. Davis, "*Particle Penetration Characteristics of Porous Metal Media for High Purity Gas Filtration*", Proceedings of the 37th Annual Technical Meeting of the Institute of Environmental Sciences, PP834–840, 1991.

The industry also wishes to achieve relatively high flow rates with relatively low pressure differential losses across the filter.

It is an object of the present invention to provide a novel method for making a porous sintered metal filter element of cup-shaped configuration which provides ultra-high efficiency in minute particle removal (9LRV) and exhibits low pressure differential losses.

It is also an object to provide such a method for making such an ultra-high efficiency filter element which may be conducted readily and at relatively low cost.

Another object is to provide such a cup-shaped ultra-high efficiency filter element which provides a relatively large area for flow of gas therethrough and exhibits relatively low pressure drop.

A further object is to provide such a filter element which exhibits a 9 log efficiency rate of removal of the most penetrating particles at a stated maximum flow rate.

SUMMARY OF THE INVENTION

It has now been found that the foregoing and related objects and advantages may be readily attained in a method for making a cup-shaped sintered metal ultra-high efficiency filter, the steps comprising providing a mold having a cylindrical cavity with an end closure at one end, and a cap at its other end removable therefrom to provide an open end. A core rod is seated in the end closure and extends coaxially within the cavity with its upper end positioned at a predetermined distance from the open other end of the mold.

The mold is oriented vertically with the open other end disposed upwardly, and metal powder having a particle size of less than 20 micrometers is introduced into the cavity through the open end of the mold while vibrating the mold to achieve substantially uniform packing of the metal powder in the cavity and at a level above the core rod.

The cap is placed on the open other end of the mold, and pressure is applied to the mold and thereby to the metal powder in the cavity to cause the metal powder to cohere and form a cup-shaped powdered metal structure having a cylindrical peripheral wall and an end wall. The cup-shaped powdered metal structure is removed from the mold, and sintered to obtain a porous cup-shaped sintered metal ultra-high efficiency filter.

In one embodiment, the mold and cap are fabricated of elastomeric material and the step of applying pressure to the mold is effected by placing the mold in a chamber filled with hydraulic fluid and pressurizing the fluid in the chamber to compress the mold and compact the powdered metal. In another embodiment, the mold and cap are fabricated of metal and the cap and end closure are formed as punches which are axially displaceable in the cavity. Pressure is applied to the mold by applying pressure to the punches to move the punches relative to each other and compact the powder in the cavity therebetween. Metal powder is high purity and has a particle size of not more than 20 micrometers in diameter.

When the mold is elastomeric, the mold is filled to the top of the cavity. When the mold is metallic, the powder is of predetermined amount and the core rod is initially positioned with its upper end adjacent the open end of the cavity. After introduction of the metal powder, and additional metal powder is disposed thereover to fill the cavity to the open end.

The metal powder is high purity and has a particle size of not more than 10 micrometers in diameter. The metal powder in the mold has a powder density of 5–15 percent. The peripheral wall of the metal filter has a substantially uniform density of about 25–45 percent and a porosity of about 55–75 percent. Preferably, the powder is a carbonyl nickel and the particles thereof are less than 10 micrometers in diameter.

In one embodiment, the mold is elastomeric and the removal step is effected by removing the cap and allowing the structure to drop by gravity from the mold. In another embodiment, the mold is metallic and the removal step is effected by removing the cap and pushing the structure outwardly of the mold by movement of the end closure towards the open end.

The integrally formed, cup-shaped porous sintered metal filter has an elongated tubular body portion and an end wall. The peripheral wall of the body portion has a substantially uniform density of about 25–45 percent and a porosity of about 55–75 percent, and the end wall has a density and a porosity approximating the values for the peripheral wall of the body.

Preferably, the metal is nickel and the particles thereof are less than 10 micrometers in diameter.

DETAILED DESCRIPTION OF THE PREFERRED EMBODIMENTS

Figure 1:
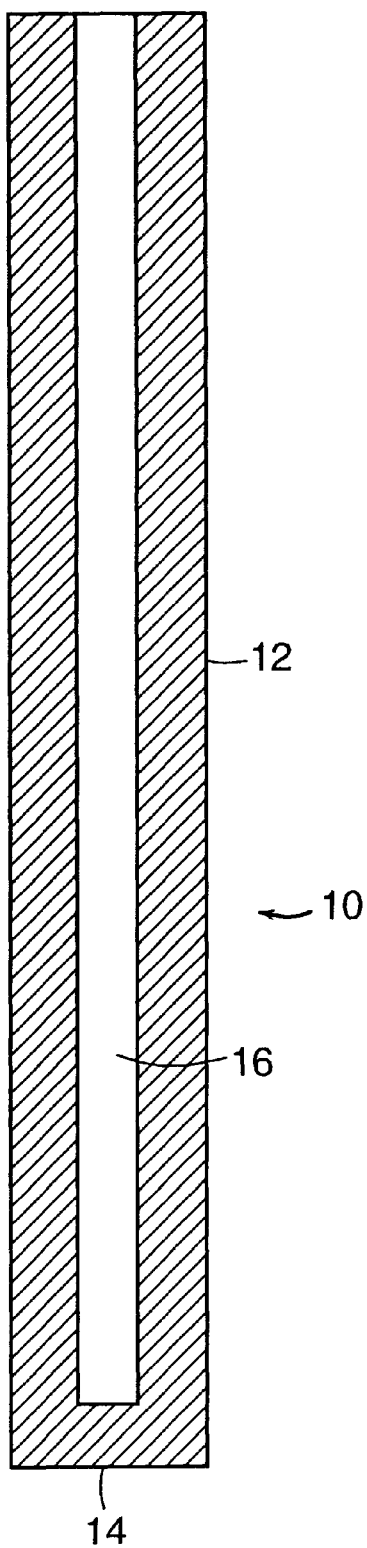
FIG. 1 is a sectional view in elevation of a cup-shaped porous sintered metal ultra-high efficiency filter produced in accordance with the present invention drawn to an enlarged scale.

As is well known, elongated tubular filters provide for greater surface area through which gas may be passed in order to effect filtration. Although cup-shaped sintered metal structures have previously been produced, these have used relatively coarse metal particles which cannot produce structures which will achieve high efficiency filtration and particularly ultra-high efficiency filtration on the order of 9 LRV for the most penetrating particle size at the maximum rated flow.

It is known that filtration to achieve such efficiency requires a very small porous structure consisting of both very small metal particles and very small pores through which the gas will pass and in which the particles be captured, primarily by the mechanism of diffusion, interception and inertial action.

Unfortunately, such very fine metal powders do not flow readily when filling cup-shaped molds due to the large surface area and structural shapes of the powder particles. Achieving uniform packing has represented a substantial impediment to molding an elongated tubular structure having a relatively thin wall.

In the process of the present invention, special molds and procedures have been developed which allow very fine metal powder to be packed substantially uniformly in the mold about a core rod and the mold may then be placed under pressure to compact the metal powder into a structure having sufficient green strength so that it can be removed and transferred to a furnace for firing to produce the ultimate structure.

Two different types of molds have been developed in accordance with the present invention to achieve the desired result and both require vibration of the mold during the filling operation to obtain the desired flow of the metal powder to achieve the desired compaction and relatively uniform density in the powder deposit about the core rod which defines the interior cavity of the cup-shaped filter. The filling procedures require close control and vary with the type of mold employed.

One mold utilizes an elastomeric material such as polyurethane to provide the peripheral wall and the top cap. The core rod is supported in a metallic base so that it is coaxial within the mold cavity. An elastomeric bushing is placed about the core rod at the bottom of the mold cavity to provide uniform characteristics for the mold surface in contact with the metal powder during the hydraulic pressing operation which will follow. To achieve compaction of the metal powder in the mold, the mold is transferred to a tank containing hydraulic fluid and the hydraulic fluid is then placed under pressure, which in turn compresses the elastomeric material of the mold to produce the desired compaction of the metal powder therewithin.

In another type of mold, a metal shell is employed. A bottom punch supports the core rod and is movable within the metallic shell, and a top punch is provided. In the use of the metal mold, the core rod is initially positioned so that its upper end is essentially aligned with the upper end of the cavity. In the initial filling operation, the mold cavity is been filled to the upper end and the bottom punch and core rod are lowered to a predetermined position and additional metal powder is placed thereabove to completely fill the cavity. Both punches move inwardly of the mold shell to compact the metal powder therebetween.

Turning now to FIG. 1, therein illustrated is a cup-shaped porous sintered metal ultra-high efficiency filter generally designated by the numeral 10 in accordance with the present invention. The filter 10 has a cylindrical or tubular body 12 of uniform thickness and end wall 14. The cavity 16 in the filter 10 will receive a gas stream which will then flow through the peripheral wall of the body 12 and the end wall 14.

Figure 2:
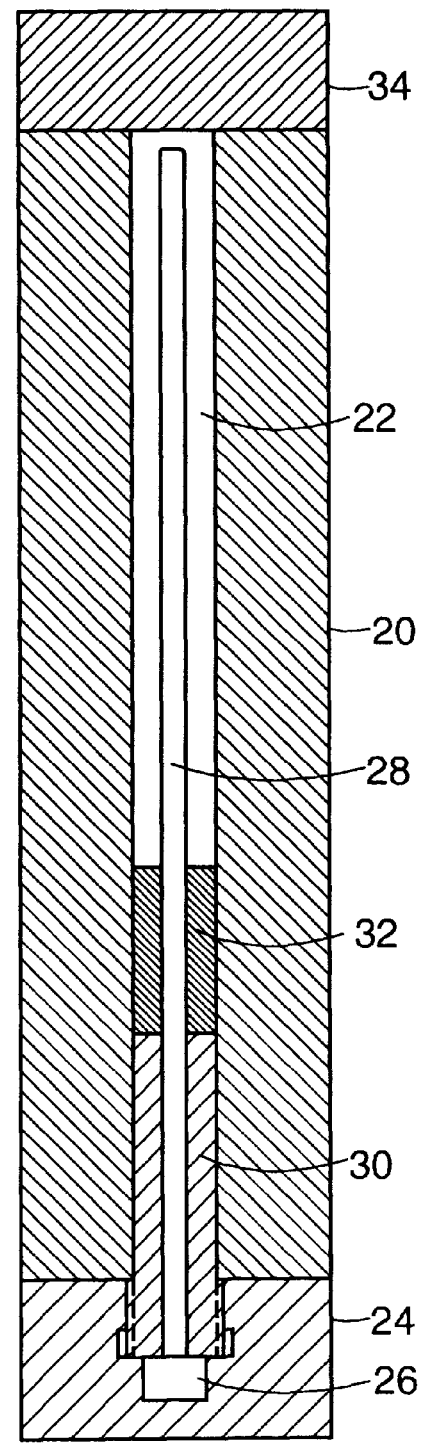
FIG. 2 is a sectional view of an elastomeric mold utilized in the practice of the present invention with metal powder disposed therein as indicated by the stippling.

Turning next to FIG. 2, therein illustrated is an elastomeric mold which is used in the production of the cup-shaped filters in accordance with the present invention. The cylindrical mold body 20 is fabricated of an elastomeric material and provides a mold cavity 22, and it has a metal base plug 24 at its lower end with a recess 26 in which is seated an elongated core rod 28. Above the base plug 24 is a metal bushing 30 which cooperates with the base plug 24 to center and stabilize the core rod 28 within the cavity 22. Disposed on the bushing 30 is an elastomeric bushing 32 which thereby provides an elastomeric surface at the base of the mold cavity 22.

As can be seen, the core rod 28 is spaced below the upper end of the mold cavity 22 and a removable cap 34 seals the upper end of the cavity 22. The cap 34 is conveniently secured to the mold body 20 by tape (not shown).

Figure 4:
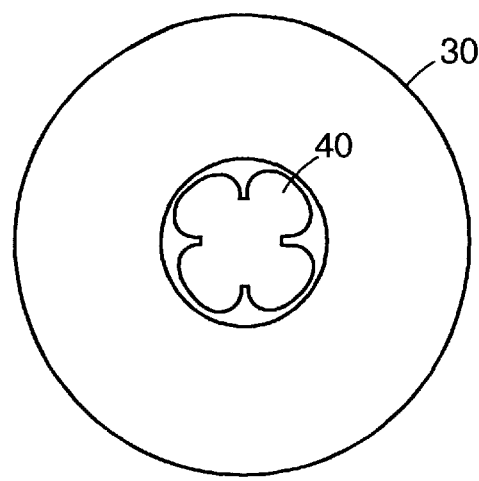
FIG. 4 is a plan view of the funnel of FIG. 3.
Figure 3:
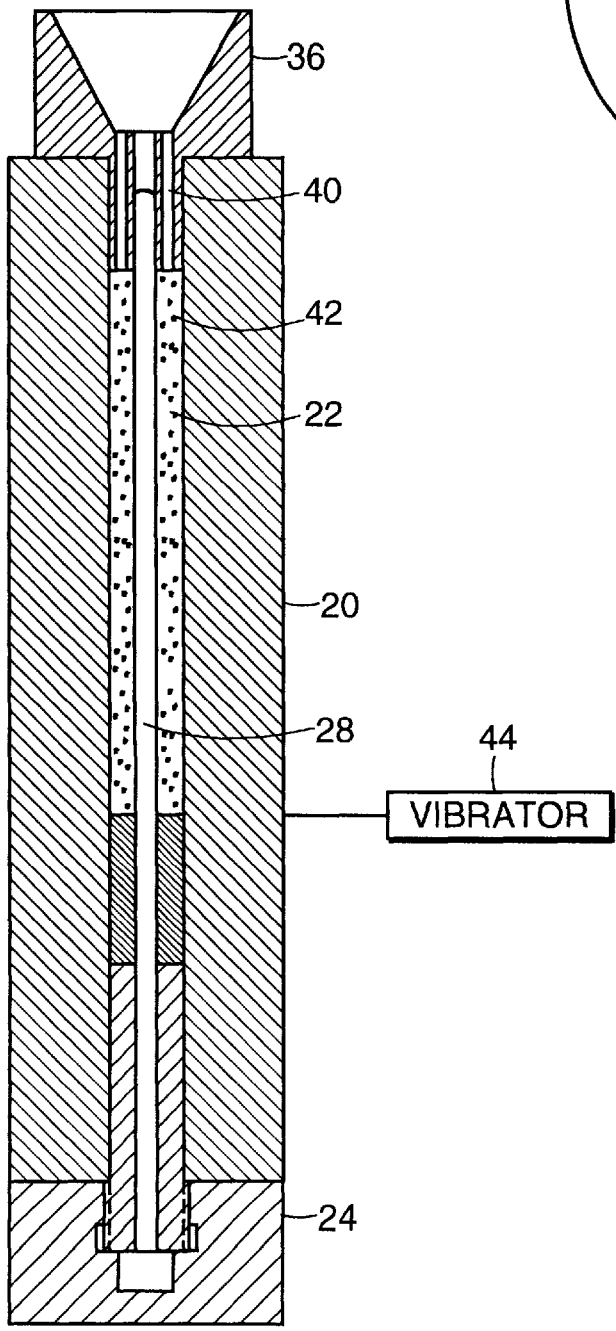
FIG. 3 is a view of the mold of FIG. 2 with the top cap removed and with a funnel placed thereon to facilitate introduction of the metal powder into the mold cavity.

In FIG. 3, the cap 34 has been removed and a funnel generally designated by the numeral 36 is seated on the open end and stabilized by the core rod 28. As seen in FIG. 4, the funnel 36 has a multilobed flow passage 40 with its central portion seating on the core rod 28 and the metal powder may flow through the lobal portions outwardly thereof.

In FIG. 3, metal powder is indicated in the cavity 22 by the stippling 42. As illustrated diagrammatically, a vibrator 44 is coupled to the mold to effect vibration of the mold and thereby the powder 42 in the cavity to increase the density and allow uniform packing.

After the metal powder 42 has substantially filled the cavity 22, the funnel 36 is removed and metal powder is placed by hand in the top of the mold cavity 22 while the vibration is continued. This is done slowly and discontinued when the powder overflows the cavity 22. The cap 34 is then placed on the filled mold 20.

Figure 6:
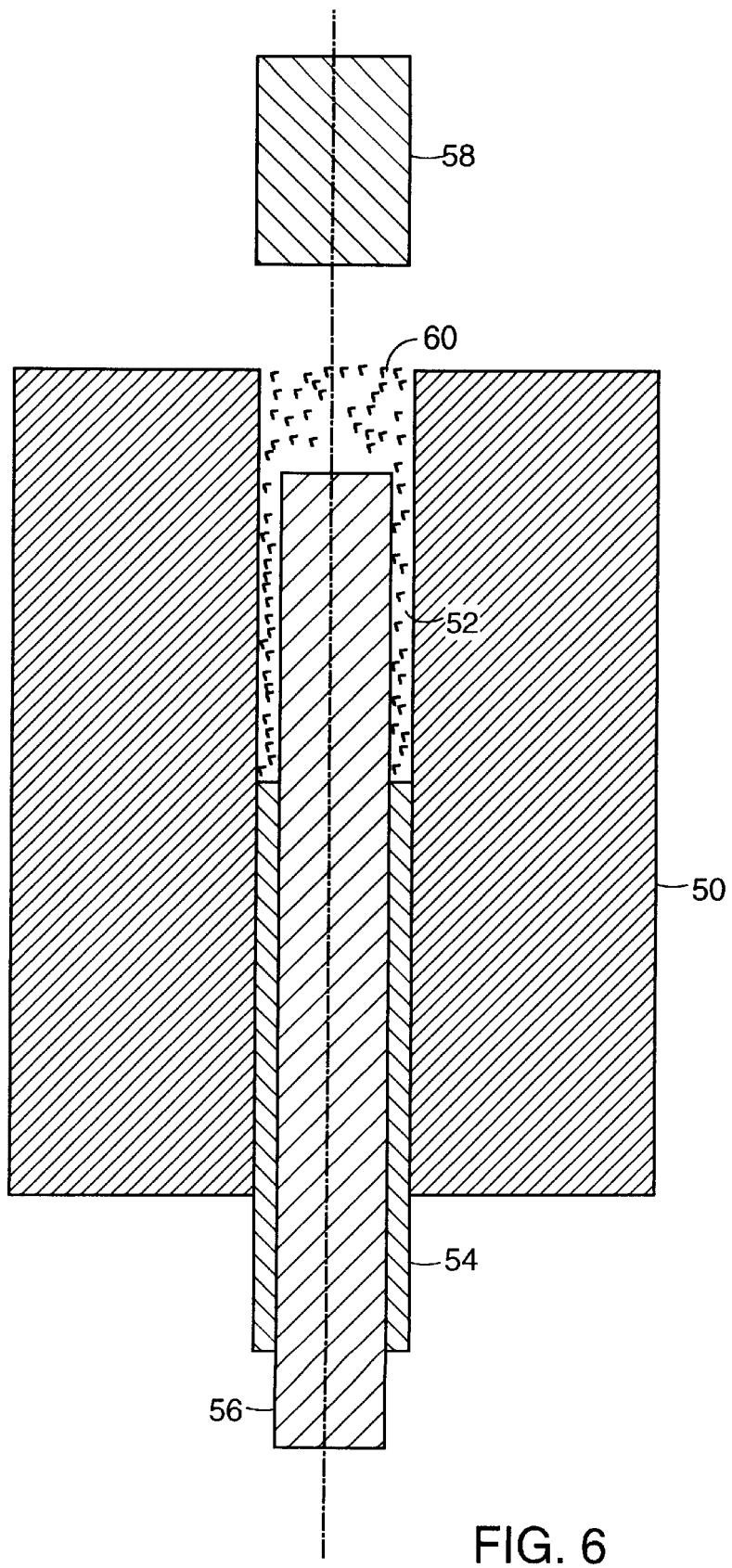
FIG. 6 shows the lower punch and core rod moved downwardly to provide a spacing at the top of the mold cavity into which has been introduced additional metal powder and further showing the upper punch positioned to move into the cavity and thereby cooperate with the lower punch to compress the metal powder therebetween.

Turning next to FIG. 6, a metallic mold is illustrated and may be used when the length to diameter ratio is less than about 3:1 as will be discussed hereinafter. The mold has a cylindrical body 50 providing an internal cavity 52, and a lower punch 54 is seated in the lower end of the mold body 50 and projects outwardly therefrom. The lower punch 54 has a bore therethrough in which is slidably seated the elongated core rod 56 which extends upwardly in the cavity 52. Positioned above the mold body 50 is the upper punch 58.

Figure 5:
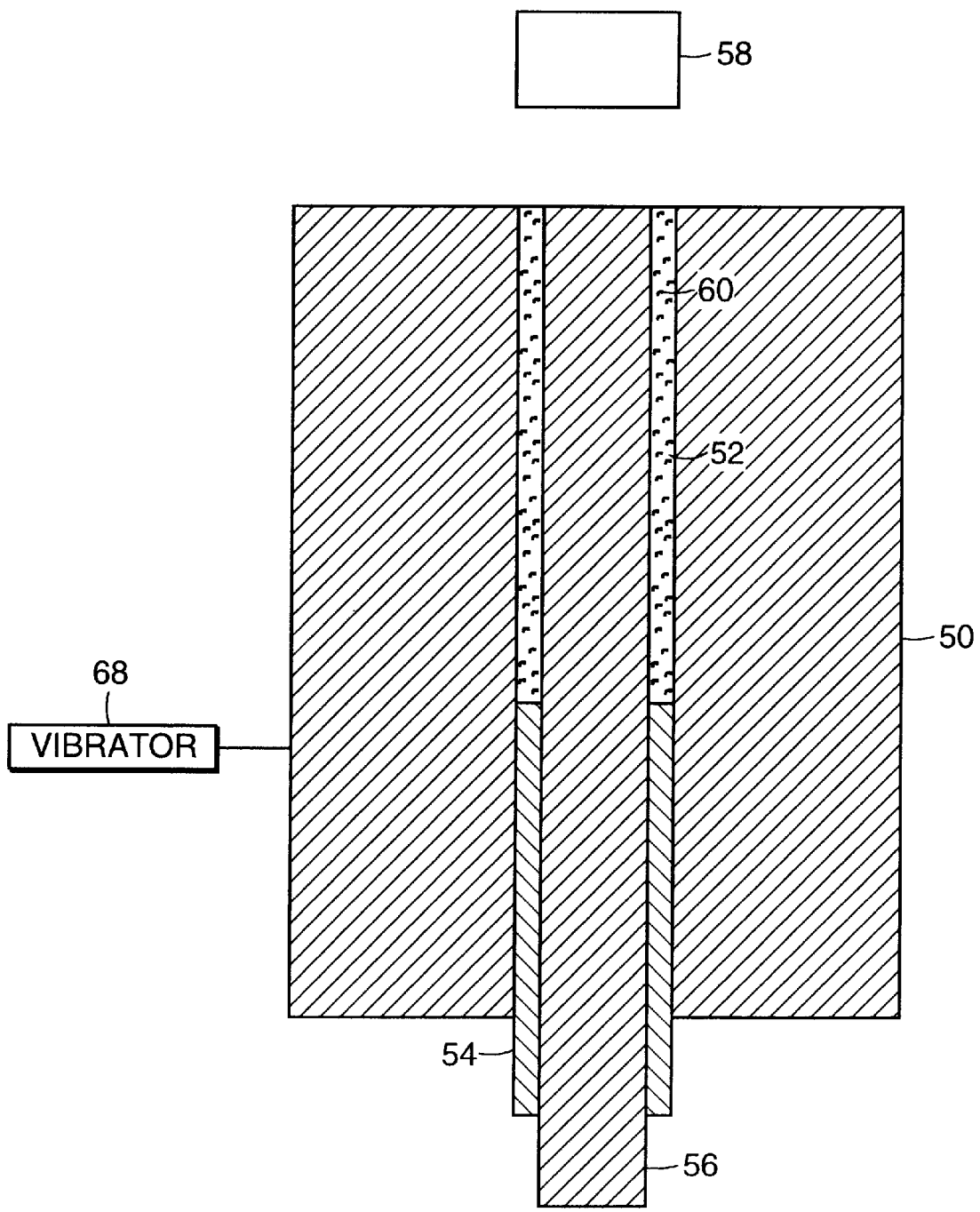
FIG. 5 is a view of another embodiment of mold fabricated from metal with the lower punch and core rod elevated to the initial fill position and showing metal powder disposed in the mold cavity by stippling.

In use of this type of mold, a predetermined weight of metal powder 60 is introduced into the cavity 52 through the open upper end while the punch 58 is removed and the core rod 56 has its upper end positioned at the upper end of the cavity. A vibrator 68 is coupled to the mold during the filling operation. After the metal powder 60 has been introduced to fill the cavity 52 as seen in FIG. 5, the lower punch 54 and core rod 56 are lowered to a predetermined position as seen in FIG. 6. While the vibration is continued, additional metal powder 60 is topped off to completely fill the cavity 52 as seen in FIG. 6. The punches 54 and 58 are moved towards each other in a press to a predetermined spacing and compress the metal power 60 in the cavity 52.

Removal of the compressed metal body from the elastomeric mold is easily effected; the cap is removed and the mold inverted. Due to the compression which has taken place, the compressed metal body will simply drop outwardly of the mold. Removal of the compressed metal body from the metal mold can be effected easily by removing the top punch and moving the core rod and lower punch upwardly to eject the compressed body from the mold cavity.

As indicated above, it is only necessary that the metal powder in the mold be compressed sufficiently to develop green strength in the metal body which will allow its transfer from the mold to the sintering furnace in which the final product will be formed.

In the instance of the elastomeric mold, the mold with the metal powder is conveniently placed in a flexible bag so that it is not in direct contact with the hydraulic fluid. It is then placed in the fluid and the tank is pressurized to 500–1500 psi, preferably 500–750 psi, for a period of ½–5 minutes to achieve the desired compaction. In the instance of the metal mold with the movable punches, it is placed in a press to effect movement of the two punches inwardly of the mold cavity and the stroke is adjusted to achieve the desired compaction. The pressure applied is also in the range of 500–1500 psi, and preferably 500–750 psi.

As to the degree of compaction attained in the molds, this will generally be at least 50%, and preferably about 60–75%.

As indicated previously, vibration is an essential part of the operation for filling the mold with the metal particles because the extremely fine metal particles utilized in the process of the present invention do not flow readily and do not pack closely without vibration. The frequency of vibration imparted to the mold during the filling operation can vary from 30 to 120 cycles per second (CPS) with about 60 CPS being preferred. Various types of vibration equipment may be employed including mechanical and ultrasonic.

The elastomeric mold has proven particularly effective in providing longer cup-shapes, i.e, having an L/D ratio of 2.5 and higher. Because of the nature of the elastomeric mold and the fact that compression is being effected uniformly over the length of the mold cavity, the compaction and density of the molded body are fairly uniform over the full length of the peripheral wall. The metal mold embodiment will tend to effect greater compaction adjacent the surfaces of the punches then at the midpoint therebetween. This produces some variation in compaction and ultimately in the porosity of wall along its length, but this variation is not considered unacceptable until the L/D ratio reaches about 3:1.

Obviously, the thickness of the peripheral wall of the body portion of the filter can be varied, and thereby effect a change in the flow rates of the filter. Moreover, it is generally desirable to provide an end wall which is slightly greater in thickness than the peripheral wall so that the gas will not tend to flow axially directly through the end wall rather than passing radially outwardly through the peripheral wall which offers the largest area for filtration. An increase of as little as 5 percent in the thickness of the bottom wall will generally produce a higher degree of uniformity of flow through the peripheral wall and end wall.

EXAMPLE

An elastomeric mold substantially as illustrated in FIGS. 2–4 is utilized and has a cavity with a diameter of 0.33 inch and a length of 3.625 inch above the bushing. The core rod is metallic and has a diameter of 0.115 inch. Its upper end is positioned 0.125 inch below the upper end of the cavity. Coupled to the mold is a vibrator operating at a frequency of 60 cps.

Using a funnel placed over the open end of the cavity, there is introduced thereinto a Type 255 carbonyl nickel powder sold by Inco having a diameter of 2–4 micrometers and characterized as a filamentary chain and bead shaped. The metal powder is dry and has an apparent density of about 7% (0.65 g/cc). During the filling operation, the vibrator is in operation to cause the powder to fill the cavity without any voids and to effect some compaction. The powder in the filled mold has an apparent density of about 10% (0.9 g/cc).

After the mold has been filled to the funnel position, it is removed and the remainder of the mold cavity is filled while the mold is being vibrated. The cap for the mold is placed over the open end and secured in position by sealing tape.

The filled mold is then placed in a elastomeric sealing bag and then introduced into a pressurizable tank filled with hydraulic fluid. The fluid is pressurized to 550 p.s.i. and compresses the elastomeric mold to compact the metal powder to a density of about 25% (2.25 g/cc).

The bag and mold are removed, the mold extracted from the bag and the cap removed. Inverting the mold allows the molded article to slide out of the mold. It is then placed in a sintering furnace with a hydrogen atmosphere at 1400° F. (760° C.) for a period of about 20 minutes at temperature. Preheating and cooling are also conducted in a hydrogen atmosphere. The sintered product is found to have about 10% shrinkage and a sintered density of about 35% (65% porosity). The outside diameter of the peripheral wall is 0.250 inch and its thickness is 0.070 inch. The base wall is 0.075 inch.

In subsequent testing, gas introduced into the open end of the filter in an inline filter housing at a flow rate of 15 SLPM (standard liters per minute) and a pressure of 8 psi.

Filtration of particles at the most penetrating particle size of about 0.1 micrometers is at an efficiency rating of 99.9999999 percent at the rated flow.

The metal powder for the filter can be any suitable corrosion-resistant metal powder having a particle size which is generally less than 20 micrometers and preferably less than 10 micrometers. Exemplary of suitable metals are nickel, Type 316 stainless steel, and a nickel/chromium/ molybdenum alloy sold by Haynes International under the trademark HASTELLOY. Binders may be employed, but are not necessary. In the case of nickel, INCO Type 255 filamentary powder having a particle size of 2–4 micrometers has proven highly effective.

By providing a cup-shaped filter in the passage of a filter housing the filter can occupy substantially the entire length of the passage through the housing and its diameter may be only slightly smaller than the diameter of the through flow passage so that only a small plenum passage is provided about the filter (e.g., 0.225 inch in a 0.250 inch passage). This reduces the amount of dead space within the body of the filter housing and minimizes the time needed to purge and dry the filter after installation and then during change-outs. Because of the large surface area provided for filtration, highly efficient flow of the gas through the filter can be attained and back pressure problems can be reduced. The extended area of a cup shape filter and the low density filter media result in relatively low pressure differential losses in the gas delivery system which typically operates in the 30–90 psi range. Low pressure differential losses are required for practical operation of an inline filter for ultra-high purity gas filtration applications.

Thus, it can be seen that the novel cup-shaped sintered metal filter produced by the present invention is highly efficient because of the large filtration surface area which it provides for flow of gas therethrough and exhibits a relative low pressure drop.

The molding process is relatively facile and fast, and permits a high degree of control. Ultra-high purity efficient of 9LRV at stated particle size and flow rates can easily be attained in suitable filter housings.

Having thus described the invention, what is claimed is:

1. A method for making a cup-shaped sintered metal ultra-high efficiency filter, the steps comprising:

(a) providing a mold having a cylindrical cavity with an end closure at one end, and a cap at its other end removable therefrom to provide an open end, and a core rod movably seated in said end closure and extending coaxially within said cavity;

(b) orienting said mold vertically with said open other end disposed upwardly;

(c) positioning the upper end of said core rod at a predetermined distance from said open other end of said mold;

(d) introducing metal powder having a particle size of less than 20 micrometers into said cavity through said open end of said mold radially evenly about said core rod near said open end of the mold while vibrating said mold to achieve substantially uniform packing of said metal powder in said cavity and to a level above said core rod;

(e) placing said cap on said other end of said mold;

(f) applying pressure to said mold and thereby to said metal powder in said cavity to cause said metal powder to cohere and form a cup-shaped powdered metal structure having a cylindrical peripheral wall and an end wall;

(g) removing said cup-shaped powdered metal structure from said mold; and (h) sintering said cup-shaped powdered metal structure to obtain a porous cup-shaped sintered metal filter.

2. The method for making a cup-shaped sintered metal ultra-high efficiency filter in accordance with claim 1 wherein said mold and cap are fabricated of elastomeric material and said step of applying pressure to said mold is effected by placing said mold in a chamber filled with hydraulic fluid and pressurizing said fluid in said chamber to compress said mold and compact said powdered metal.

3. The method for making a cup-shaped sintered metal ultra-high efficiency filter in accordance with claim 2 wherein said metal powder fills said cavity to the open end of said mold.

4. The method for making a cup-shaped sintered metal ultra-high efficiency filter in accordance with claim 1 wherein said mold and cap are fabricated of metal and said cap and end closure are formed as punches which are axially displaceable in said cavity and wherein said step of applying pressure to said mold is effected by applying pressure to said punches to move said punches relative to each other and compact the powder in said cavity therebetween.

5. The method for making a cup-shaped sintered metal ultra-high efficiency filter in accordance with claim 4 wherein said metal powder is introduced in a predetermined quantity and wherein the upper end of said core rod is positioned closely adjacent the open end of said cavity and lowered after filling of the cavity with metal powder, and additional metal powder is disposed thereover to fill said cavity to said open end.

6. The method for making a cup-shaped sintered metal ultra-high efficiency filter in accordance with claim 1 wherein said metal powder has a particle size of not more than 10 micrometers in diameter.

7. The method for making a cup-shaped sintered metal ultra-high efficiency filter in accordance with claim 1 wherein said metal powder in said mold has a density of 5–15 percent.

8. The method for making a cup-shaped sintered metal ultra-high efficiency filter in accordance with claim 1 wherein the peripheral wall of said sintered metal filter has a substantially uniform density of about 25–45 percent and a porosity of about 55–75 percent.

9. The method for making a cup-shaped sintered metal ultra-high efficiency filter in accordance with claim 1 wherein said powder is a carbonyl nickel and the particles thereof are less than 10 micrometers in diameter.

10. The method for making a cup-shaped sintered metal ultra-high efficiency filter in accordance with claim 1 wherein said mold is elastomeric and wherein said removal step is effected by removing said cap and allowing said structure to drop by gravity from said mold.

11. The method for making a cup-shaped sintered metal ultra-high efficiency filter in accordance with claim 1 wherein said mold is metallic and said removal step is effected by removing said cap and pushing said structure outwardly of said mold by movement of said end closure towards said open end.

12. The method for making a cup-shaped sintered metal ultra-high efficiency filter in accordance with claim 1 wherein said metal filter achieves a removal rating of at least 99.9999999% at the most penetrating particle size at the maximum rated flow.

13. The method for making a cup-shaped sintered metal ultra-high efficiency filter in accordance with claim 1 wherein said filter has a pressure drop of less than 8 psi at the maximum rated flow.

14. The method of claim 1 wherein step vibrates at a frequency between 30 and 120 CPS.

15. The method of claim 14 wherein the frequency of vibration is about 60 CPS.

16. The method of claim 1 wherein step (d) introduces the metal powder with a funnel placed about the core rod.

17. The method of claim 16 wherein the funnel has a plurality of lobe-shaped openings extending radially outward from the core rod.

18. The method of claim 16 wherein the funnel is used to introduce metal to a level about equal to a top of the core rod and wherein the metal is introduced without the funnel to a level about equal to the open end of the mold.

19. The method of claim 1 wherein said pressure is between about 500 psi and about 1500 psi.

20. The method of claim 19 wherein the pressure is between about 500 psi and about 700 psi.

21. The method of claim 1 wherein the mold has an interior length to diameter ratio of greater than about 2.5.

22. The method of claim 4 wherein the mold has an interior length to diameter ratio of less than about 3:1.

23. A method of making a cup-shaped metal filter, comprising:
(a) filling a mold defining an annular inner chamber for a first length and a cylindrical chamber for a second length with metal powder having a particle size less than 20 micrometers by introducing said particles into said mold with a substantially even radial distribution;
(b) vibrating said mold during step (a);
(c) after step (a) enclosing said mold;
(d) placing the mold under pressure to form a work piece filter; and
(e) sintering the work piece filter to form the cup-shaped filter.

24. The method of claim 23 wherein step (c) vibrates the mold at a frequency between 30 and 120 CPS.

25. The method of claim 24 wherein the frequency of vibration is about 60 CPS.

26. The method of claim 23 wherein step (a) introduces the metal powder with a funnel placed about the core rod.

27. The method of claim 26 wherein the funnel has a plurality of lobe-shaped openings extending radially outward from the core rod.

28. The method of claim 26 wherein the funnel is used to introduce metal into the annular chamber but not for the cylindrical chamber.

29. The method of claim 23 wherein step (d) places said mold under pressure between about 500 psi and about 1500 psi.

30. The method of claim 29 wherein the pressure is between about 500 psi and about 700 psi.

31. A method of making a cup-shaped metal filter, comprising:
(a) positioning a first cylindrical punch about a rod and within a cylindrical mold to define an annular cavity between the rod and the mold;
(b) filling the annular cavity with a radial even distribution of a predetermined weight of metal powder;
(c) repositioning the first punch relative to the mold to define a second cavity;
(d) compacting the metal powder in the mold with a second punch at an end of the chamber opposite the end having the first punch;
(e) removing the compacted work piece and sintering the work piece to form the cup-shaped filter.

32. The method of claim 31 wherein the mold is vibrated during step (b).

33. The method of claim 32 wherein during step (c) metal powder is filled in the mold using a radial even distribution.

34. The method of claim 32 wherein step (f) compacts the metal powder sufficiently so that the work piece attains a green strength.

35. The method of claim 32 wherein the second cavity is cylindrically shaped.

* * * * *